United States Patent

Persson et al.

[11] Patent Number: 4,775,263
[45] Date of Patent: Oct. 4, 1988

[54] ARRANGEMENT FOR OPERATING A SELF-PROPELLED VIBRATORY PLATE DEVICE AND METHOD FOR USING SAID ARRANGEMENT

[75] Inventors: Gert Persson; Gunnar Grane, both of Lyckeby, Sweden

[73] Assignee: Dynapac AB, Solna, Sweden

[21] Appl. No.: 40,241

[22] Filed: Apr. 20, 1987

[30] Foreign Application Priority Data

Apr. 23, 1986 [SE] Sweden ................. 8601855

[51] Int. Cl.⁴ ............................................. E01C 19/34
[52] U.S. Cl. ..................................... 404/133; 56/11.3; 192/129 R
[58] Field of Search .......... 404/97, 112, 113, 131, 404/133; 192/129 R, 133; 74/501 R, 543, 545; 56/11.3, 11.7

[56] References Cited

U.S. PATENT DOCUMENTS

| | | | |
|---|---|---|---|
| 2,888,863 | 6/1959 | Eisenbeis | 404/112 |
| 2,979,996 | 4/1961 | Spitler et al. | 404/112 |
| 3,832,080 | 8/1974 | Stoecker | 404/133 |
| 3,883,260 | 5/1975 | Heckner | 404/133 |
| 3,972,637 | 8/1976 | Sutherland | 404/133 |
| 4,277,936 | 7/1981 | Hoff | 56/11.7 |
| 4,316,355 | 2/1982 | Hoff | 56/11.3 |
| 4,499,779 | 2/1985 | Maass | 404/133 X |
| 4,629,359 | 12/1986 | Sengupta | 404/112 |

FOREIGN PATENT DOCUMENTS

| | | | |
|---|---|---|---|
| 2355122 | 1/1978 | France | 404/131 |
| 2410704 | 8/1979 | France | 404/131 |

*Primary Examiner*—Jerome Massie
*Assistant Examiner*—John F. Letchford
*Attorney, Agent, or Firm*—Walter Ottesen

[57] ABSTRACT

The invention relates to an arrangement and method for operating a self-propelled vibratory plate device. The vibratory plate of this device receives its vibratory motion from counter-rotating eccentric parts driven by an internal combustion engine. According to the method, the vibratory plate is stopped with a deadman's handle mounted on the device without the engine stopping. The method is realized with the arrangement of the invention which includes the deadman's handle. The deadman's handle is connected to the engine's fuel control and a centrifugal clutch between the engine and the eccentric parts is engaged only when the speed of the engine is above idle speed. A cam is provided with an interacting support which limits the angular movement of the deadman's handle to a position which corresponds to the idle speed of the engine.

10 Claims, 2 Drawing Sheets

4,775,263

ARRANGEMENT FOR OPERATING A SELF-PROPELLED VIBRATORY PLATE DEVICE AND METHOD FOR USING SAID ARRANGEMENT

FIELD OF THE INVENTION

The invention relates to a self-propelled vibratory plate device for consolidating soil or the like. The vibratory plate device includes a wide plate operatively connected to an elongated control handle which is equipped with a deadman's handle that stops propelling the device, if the operator's grip on the control handle ceases.

BACKGROUND OF THE INVENTION

It is already known that self-propelled machines of different kinds are equipped with safety devices of the deadman's handle type, but when it comes to vibratory plates it is less usual. Because heavier plates have considerable propulsion power and are often used in small spaces or where stationary barriers could exist, it is very desirable that they be equipped with the above-mentioned safety device that works independently of whether the motion is forwards, or backwards, so that it can prevent accidents or other types of damage.

SUMMARY OF THE INVENTION

The particular invention refers to a self-propelled and hand-maneuvered vibratory plate equipped with an elongated control handle to control the plate device. The control handle is equipped with a deadman's handle. During the operation of the plate device the deadman's handle is held up. In this case, the vibratory plates are propelled by two, or more, eccentric counter-rotating parts. The rotating eccentric parts generate a resultant force the direction of which is variable. The eccentric parts in the invention are driven by an internal combustion engine via a centrifugal clutch. The centrifugal clutch is configured so that it drives the eccentric parts when the number of revolutions of the internal combustion engine is above idle speed. According to the invention, the deadman's handle is connected to the throttle of the internal combustion engine (gasoline motor) or to its fuel feed (diesel engine) in such a way that if the handle is inactive, the engine idles and when the handle is lifted up, the engine is set to working speed. If the handle is pressed down, beyond the inactive position, the ignition of the engine is short circuited (gasoline motor) or the fuel feed is interrupted completely (diesel engine) and the internal combustion engine stops.

Usually vibratory plates need only three speeds: stopped, idle, and working speed. With the arrangement of the invention, these three speeds can be obtained with only one control, the deadman's handle. Therefore, no separate speed control device of the internal combustion engine or no separate stop control is needed. It is also an advantage that the propulsion can be stopped with the engine speed decreased only to idle speed instead of to a complete stop. Therefore the plate could immediately be moved, for example, in the other direction, without time consuming restarting of the engine.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
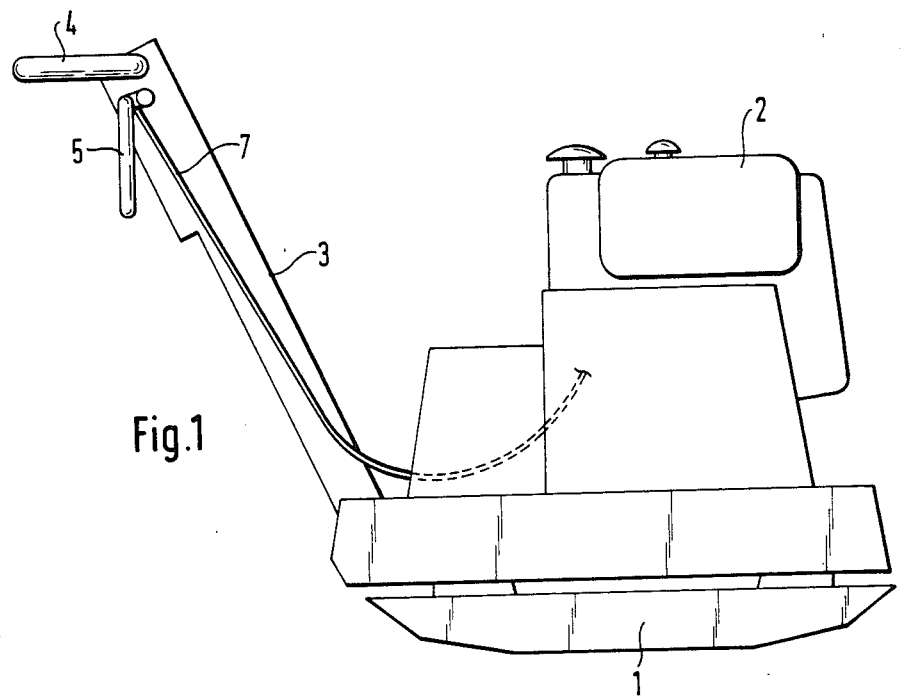
FIG. 1 shows a side elevation view of a vibratory plate device equipped with an arrangement according to an embodiment of the invention which includes a deadman's handle.
Figure 2:
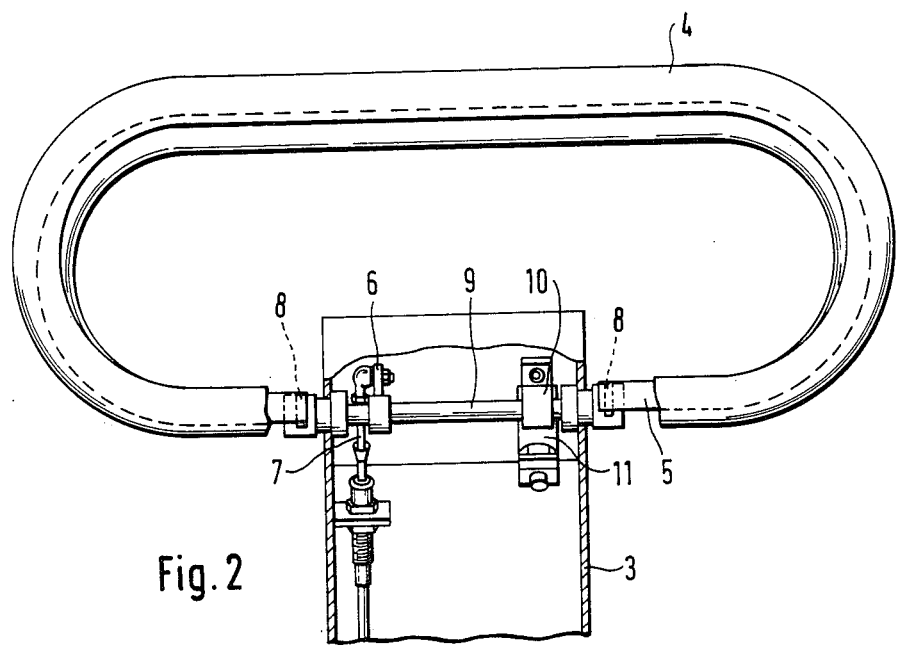
FIG. 2 shows the upper part of the plate control rod with a control handle and the deadman's handle; and, FIGS. 3 and 4 show a vertical section view through the upper part of the handle with the deadman's handle in the uplifted and dropped positions, respectively.
Figure 3:
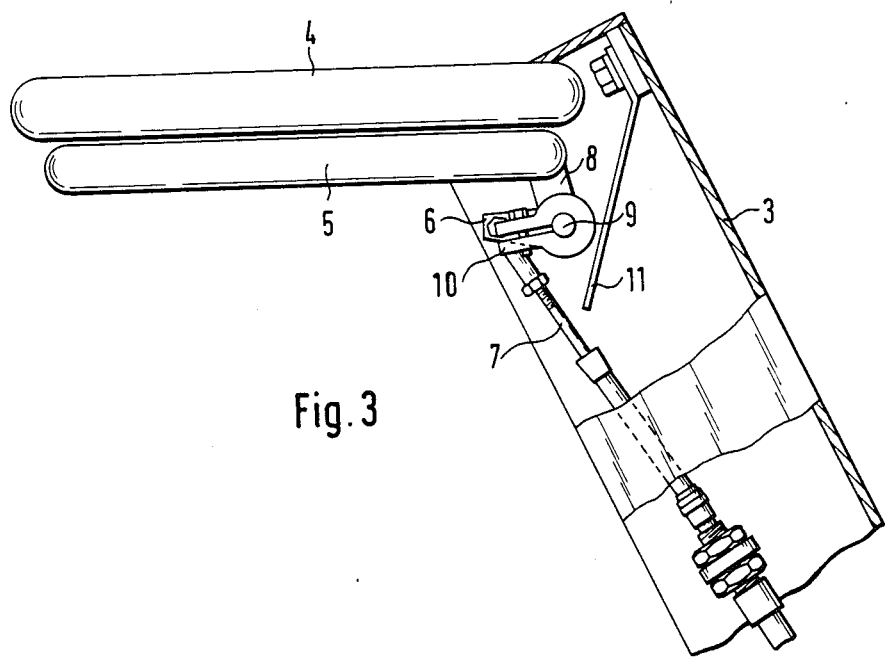

FIG. 1 shows the vibratory plate device with its bottom plate 1 and an internal combustion engine 2 to drive the vibratory parts of the plates. the vibratory plate device is maneuvered by a control column 3 mounted on the vibratory plate device. The upper end of the control column is equipped with a control handle 4 and a deadman's handle 5.

The internal combustion engine 2 drives two or more eccentric parts (not shown) so that they counter rotate. The rotating eccentric parts impart a vibratory motion to the plate and a motion forward or backward, depending on the direction of the resultant force generated by the rotating eccentric parts.

In the example shown, the deadman's handle, or the safety handle is pivotally mounted on the control rod 3. The handle 5 has about the same shape and dimensions as the control handle 4 with the difference that the length of the handle 5 parallel to the control handle 4 is shorter than the latter so that it is easier for the operator to grip the control handle 4 and the handle 5 at the same time.

The eccentric parts of the vibratory plate device are driven by the internal combustion engine 2 via a centrifugal clutch. The centrifugal clutch is configured such that it only drives the eccentric parts when the rotational speed (rpm) of the internal combustion engine is above idle speed.

The internal combustion engine's stop, idle and working speed are set according to the invention by the deadman's handle which is pivotally mounted on the control handle. When the deadman's handle is in the dropped position, shown in FIG. 4, the internal combustion engine idles.

The handle 5 is mounted on the control rod by means of two arms 8 extending therefrom. The levers 8 are fixedly attached to a shaft 9 which is pivotally mounted in the control column 3. Also mounted on the shaft 9 is a trip lever 6 which is connected to the fuel control 7 of the engine. When the handle 5 is rotated with respect to the control handle 4, the shaft 9 and with it the trip lever 6 rotates, and the fuel control 7 of the engine is moved simultaneously.

When the handle 5 is lifted up towards the control handle 4, the fuel control 7 is set so the engine runs at working speed. From this position the handle 5 can, by its own weight, fall down to a dropped position that sets the fuel control so the engine idles.

Figure 4:
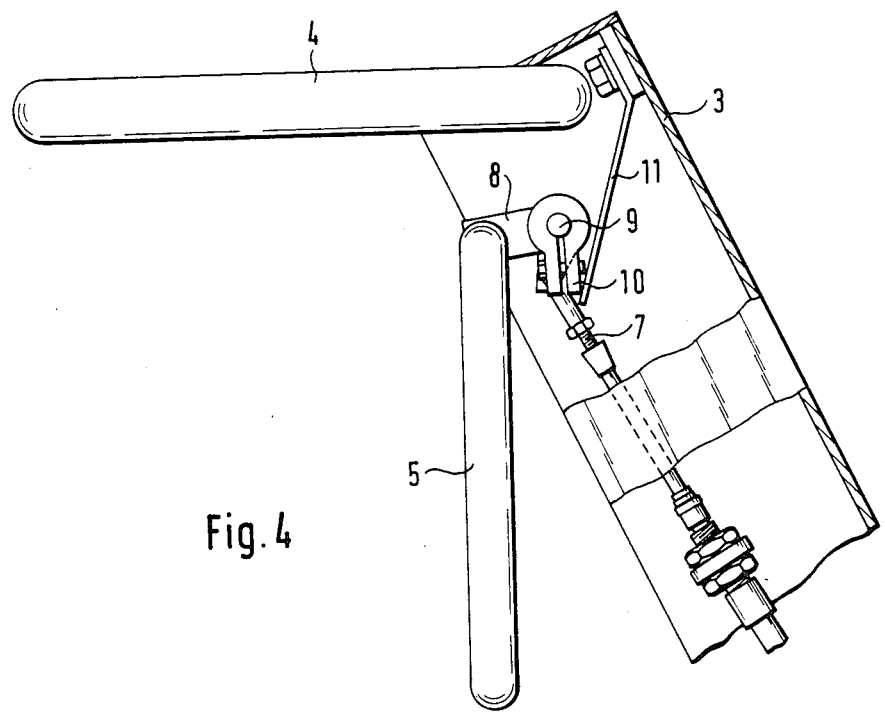

A cam 10 is mounted on the shaft 9 and bears against a spring-loaded support 11 when the handle 5 is in the position shown in FIG. 4. In the embodiment shown, the cam 10 is configured like a clip and it can be adjusted relative to the shaft 9 so that the correct idle speed of the engine can be obtained when the cam 10 bears against the spring-loaded support 11.

If the handle 5 is pressed down even more against the force of the spring-loaded support 11 (stop position), the fuel feed to the engine is interrupted and the engine stops. This arrangement is sufficient for diesel engines. If the engine is a gasoline engine, it is appropriate to have an electric switch in the ignition circuit which bears against the support 11 if the handle 5 is pressed down towards its stop position.

When the vibratory plate device is to be used, it is started in the usual way. Due to its weight, the deadman's handle 5 is in idle position and needs to be lifted up towards the control handle 4 for the eccentric parts to start to rotate. The deadman's handle 5 and the control handle 4 are gripped at the same time by the operator and the plate starts to vibrate and move forward or backward depending on how the eccentric parts are adjusted. As soon as the operator releases the control handle (and the deadman's handle), the deadman's handle swings down due to its own weight, and the engine speed is set to idle speed, and the vibratory plate device stops because the centrifugal clutch no longer connects the engine with the eccentric parts.

It is understood that the foregoing description is that of the preferred embodiments of the invention and that various changes and modifications may be made thereto without departing from the spirit and scope of the invention as defined in the appended claims.

What is claimed is:

1. Method for operating a self-propelled vibratory plate device equipped with a control handle and a deadman's handle to stop the motion of the vibratory plate, forward or backward, the plate receiving its directional vibratory motion from counter-rotating eccentric parts, driven by an internal combustion engine via a centrifugal clutch, the centrifugal clutch starting to operate only when the engine speed is above idle speed, the deadman's handle being rotatably mounted on the device for rotating between an uplifted position, a drop position and a stop position, the method comprises the steps of stopping the internal combustion engine, setting the engine to idle speed, and setting the engine to working speed with only a single control in the form of the deadman's handle mounted adjacent the control handle of the device and connected to the fuel control of the engine so that the engine runs at idle speed when the deadman's handle is inactive or in the drop position.

2. An arrangement for operating a self-propelled vibratory plate device, the vibratory plate device including vibratory plate means to which motion is imparted by counter-rotating eccentric parts, the eccentric parts being driven by an internal combustion engine via a centrifugal clutch which engages to operate said vibratory plate means at an engine working speed above idle speed, the arrangement comprising:

a supporting structure on said device;
a control handle attached to said supporting structure to enable an operator to maneuver said device;
a rotatable shaft rotatably journalled in said supporting structure adjacent said control handle;
actuating means for acting on said engine to control the latter to operate in three modes of operation: stop, said idle speed and said working speed;
a deadman's handle fixedly attached to said rotatable shaft so as to be rotatable through respective angles corresponding to said modes of operation;
transmitting means connecting said deadman's handle to said actuating means for transmitting the angular movement of said deadman's handle to the latter to effect said modes of operation;
said deadman's handle being rotatable: to an uplifted position directly against said control handle corresponding to said working speed so as to permit said deadman's handle to be held in said uplifted position against the force of its own weight; to a drop position corresponding to said idle speed; and, to a last position beyond said drop position and corresponding to said stop whereat the engine is shut off;
said deadman's handle being cantilever attached to said rotatable shaft to ensure that the same rotatively drops entirely unassisted under the force of gravity into said drop position;
resilient means for resiliently engaging said deadman's handle when the latter drops into said drop position to prevent said deadman's handle from swinging clear through said drop position and into said stop position thereby preventing a shut off of the engine; and,
said resilient means being configured so as to permit said deadman's handle to be manually moved against the resilient force of said resilient means to said last position.

3. The arrangement of claim 2, said resilient means being a resilient strip of metal mounted on said supporting structure adjacent said rotatable shaft; and, said arrangement further comprising a cam fixedly attached to said shaft so as to bear against said resilient strip to define said drop position.

4. The arrangement of claim 3, said control handle having a predetermined shape and extending outwardly from said supporting structure a predetermined first distance; said deadman's handle extending outwardly from said supporting structure a second distance slightly less than said first distance when in said uplifted position so as to permit an operator to comfortably grasp both of said handles at the same time.

5. The arrangement of claim 3, comprising adjustment means for fixedly adjusting the position of said cam relative to said shaft.

6. The arrangement of claim 3, said cam being configured as a clip in surrounding engagement with said shaft; and, tightening means for tightening said cam on said shaft.

7. An arrangement for operating a self-propelled vibratory plate device, the vibratory plate device including vibratory plate means to which motion is imparted by counter-rotating eccentric parts, the eccentric parts being driven by an internal combustion engine via a centrifugal clutch which engages to operate said vibratory plate means at an engine working speed above idle speed, the arrangement comprising:

a supporting structure on said device;
a control handle attached to said supporting structure to enable an operator to maneuver said device;
a rotatable shaft rotatably journalled in said supporting structure adjacent said control handle;
actuating means for acting on said engine to control the latter to operate in three modes of operation: stop, said idle speed and said working speed;
a deadman's handle fixedly attached to said rotatable shaft so as to be rotatable through respective angles corresponding to said modes of operation;
displaceable transmitting means connecting said deadman's handle to said actuating means for transmitting the angular movement of said deadman's handle to the latter to effect said modes of operation;

said deadman's handle being rotatable: to an uplifted position directly against said control handle corresponding to said working speed so as to permit said deadman's handle to be held in said uplifted position against the force of its own weight; to drop under its own weight into a drop position corresponding to said idle speed; and, to a last position beyond said drop position and corresponding to said stop whereat the engine is shut off; and, adjusting means interposed between said deadman's handle and said displaceable transmitting means for adjusting the displacement of said transmitting means to adjust the idle speed to a predetermined setting when said deadman's handle drops into said drop position.

8. The arrangement of claim 7, said adjusting means comprising: a cam fixedly attached to said shaft and connected to said displaceable transmitting means for imparting displacing movement to said displaceable transmitting means when said deadman's handle moves into said drop position; and, fixing means for adjustably fixing the position of said cam relative to said shaft.

9. An arrangement for operating a self-propelled vibratory plate device, the vibratory plate device including vibratory plate means to which motion is imparted by counter-rotating eccentric parts, the eccentric parts being driven by an internal combustion engine via a centrifugal clutch which engages to operate said vibratory plate means at an engine working speed above idle speed, the arrangement comprising:

a supporting structure on said device;
a control handle attached to said supporting structure to enable an operator to maneuver said device;
a rotatable shaft rotatably journalled in said supporting structure adjacent said control handle;
actuating means for acting on said engine to control the latter to operate in three modes of operation: stop, said idle speed and said working speed
a deadman's handle fixedly attached to said rotatable shaft so as to be rotatable through respective angles corresponding to said modes of operation;
displaceable transmitting means connecting said deadman's handle to said actuating means for transmitting the angular movement of said deadman's handle to the latter to effect said modes of operation;
said deadman's handle being rotatable: to an uplifted position directly against said control handle corresponding to said working speed so as to permit said deadman's handle to be held in said uplifted position against the force of its own weight; to a drop position corresponding to said idle speed; and, to a last position beyond said drop position and corresponding to said stop whereat the engine is shut off;
said deadman's handle being cantilever attached to said rotatable shaft to ensure that the same rotatively drops entirely unassisted under the force of gravity into said drop position;
resilient means for resiliently engaging said deadman's handle when the latter drops into said drop position to prevent said deadman's handle from swinging clear through said drop position and into said stop position thereby preventing a shut off of the engine;
said resilient means being configured so as to permit said deadman's handle to be manually moved against the resilient force of said resilient means to said last position; and,
adjusting means interposed between said deadman's handle and said displaceable transmitting means for adjusting the displacement of said transmitting means to adjust the idle speed to a predetermined setting.

10. The arrangement of claim 9, said resilient means being a resilient strip of metal mounted on said supporting structure adjacent said rotatable shaft; and, said arrangement further comprising a cam fixedly attached to said shaft so as to bear against said resilient strip to define said drop position

* * * * *